United States Patent Office 3,331,697
Patented July 18, 1967

3,331,697
ADHESIVE COMPOSITION
Edward J. Salamon, Dover, N.J., assignor to Allied Chemical Corporation, New York, N.Y., a corporation of New York
No Drawing. Filed Oct. 22, 1963, Ser. No. 318,086
8 Claims. (Cl. 106—213)

This invention relates to adhesives and more particularly to new and improved adhesive compositions especially adapted for bonding of gypsum and cellulosic materials. It also relates to adhesives for bonding together the gypsum based elements constituting gypsum partition systems and to the assembly of such systems.

New adhesive materials are always in demand for several reasons including the bonding of new materials and in making possible the assembly and use of more advanced and efficient structures. Non-load bearing gypsum partitions are well-known and include a wide variety of different structural systems. The basic structural element of these partition systems is gypsum wallboard which is a laminate composed mainly of a gypsum board or core covered on at least one and usually both sides with a relatively thin sheet of cellulosic material such as heavy paper or cardboard. Gypsum partition systems are conventionally assembled with fasteners of various types or with adhesives or by combination of both fasteners and adhesive materials. Many of the proposed partition systems are solid throughout and constructed of a number of gypsum wall boards laminated together while others are basically stud type systems having two wallboards separated and supported by a vertical member which may be metal, wood, or even a gypsum based material such as that which may be derived from gypsum wallboard itself. New partition systems are proposed with fairly good regularity in an effort to provide stronger, more simplified and efficient structures. Many of these improved systems rely heavily upon adhesive materials for strength, stability, and efficiency in assembly. For example, a partition system based on a gypsum stud member usually requires an adhesive material of exacting specifications for full realization of its advantages. Unfortunately, adhesive materials heretofore suitable for gypsum wallboard have left considerable room for improvement and have been less than fully adequate for use with the more advanced and simplified systems.

An object of the present invention is to provide a new and improved adhesive and particularly an adhesive adapted for bonding of gypsum and cellulosic material such as heavy paper and cardboard as conventionally employed in gypsum wallboards.

Another object of the invention is to provide a high strength adhesive material for use in assembly of gypsum partition systems.

Another object of the invention is to provide an adhesive material combining high strength and other desired properties permitting rapid and efficient assembly of gypsum partition systems.

A further object of the invention is to provide an adhesive material permitting the construction of high strength rigid stable partition systems based on gypsum type stud elements.

Other objects and advantages will be evident from the following description of the invention.

In accordance with the invention an adhesive especially suitable for efficient high strength bonding of gypsum and cellulosic material has been found to be provided by highly filled aqueous compositions containing a small percentage of an alkylene oxide modified starch. The adhesive of the invention is an aqueous paste comprising: (a) about 3 to 15%, preferably 5 to 10%, by total weight of a modified starch obtained by reacting nonglutinous starch with a lower alkylene oxide, preferably ethylene oxide; (b) about 2 to 20%, preferably 4–10%, by weight of a fibrous reinforcing filler, preferably asbestos; (c) about 30 to 65%, preferably 45 to 55%, by weight of a particulate filler, preferably finely divided limestone; and (d) water in an amount sufficient to give a solids content between about 45–75% by weight, preferably a solids content between 55–70% by weight. The adhesive composition of the invention when used in assembly of gypsum wallboard partition systems has been found to exhibit a combination of particularly desirable properties including exceptionally high strength, excellent initial tack, fast drying time and low water demand which benefits drying and minimizes shrinkage of the in-place composition which is an important factor in gypsum board assembly. Despite its fast drying time the adhesive composition has also been found to have an extended "open time" in that the adhesive will remain tacky for relatively long periods of from 15 to 30 minutes or more. This of course has the advantage of permitting the adhesive to be applied to many different sections over a relatively extended time period before it is required to assemble the elements to be bonded. The adhesive composition exhibits good storage life and may be supplied to the job in ready-to-use paste form. Also, the composition has good flow characteristics and workability and may be easily applied by means of a caulking gun or similar efficient means.

The alkylene oxide modified starch employed in the adhesive composition of the invention is a fine, granular material soluble in water at room temperature and obtained by reacting starch with a lower alkylene oxide to form the starch hydroxyalkyl-ethers. The starch-ether especially useful in the invention are those prepared by the reaction of the starch with between about 1–10% by weight of the starch of an alkylene oxide having two or three carbon atoms i.e. ethylene oxide or propylene oxide. Most all starch products may be modified by reaction with the lower alkylene oxides. Such starches may be glutinous or nonglutinous and include the root starches, cereal starches, acid modified thin boiling starches and oxidized starches. Specific examples of such starches include those derived from potato, corn, wheat, rice and tapioca. The gypsum wallboard adhesive of the invention is most desirably prepared from the modified root starch which as a group include potato starch and tapioca starch. The alkylene oxide modified starches useful in the invention may be prepared by known procedures as described, for example, in U.S. Patents 2,516,632, 2,516,-633 and 2,516,634 of July 25, 1950, by reaction of the original starch granules in an enclosed zone with the alkylene oxide at elevated temperatures between about 100–180° F. The resulting product is preferably rapidly dried as on heated rolls. Particularly excellent adhesive compositions are formed from the modified starches derived from potato starch by reaction with between about 1–7% by weight of ethylene oxide. The preferred starch materials are dry granules having a viscosity between 3,000–7,000 cps., desirably between 4,000–6,500 cps. as measured in a 20% aqueous solution at 25° C. The alkylene oxide modified starch is employed in the adhesive in an amount between about 3–15% by total weight of the paste composition. At least about 3% by weight is required to provide the desired adhesiveness while amounts in excess of about 15% are less economical and undesirable because of depreciation of working properties. Best results are obtained when the modified starch represents between about 5–10% by weight of the total composition.

The adhesive of the invention includes filler materials of both the fibrous reinforcing type and the particulate type. The fibrous filler is preferably inorganic such as asbestos. The particulate filler is also preferably inorganic such as clay, silica, mica, talc, calcium carbonate, or mixtures thereof. Excellent results are obtained with the more finely divided material fillers having particulate size less than about 100 microns, preferably between about 1 to 50 microns. The particularly preferred particulate filler material is limestone having particle size between about 1 to 25 microns. Special limestones of this type are available commercially under trademark "Duramite" from the Thompson, Weinman & Company. The particulate filler represents the predominant portion of total filler, and is employed in amounts between about 30 to 65%, preferably between about 45 to 55%, based on the weight of the total adhesive composition. The fibrous filler represents about 2 to 20%, perferably about 4 to 10%, based on the weight of the compositions.

The adhesive desirably includes a preservative for the modified starch base. Examples of suitable preservatives include the chlorinated phenols and polyphenols, formaldehyde, and phenylmercurials. A small amount of preservative is satisfactory, usually between about 0.1 to 0.6 percent, preferably between about 0.1 to 0.2 percent.

A wetting agent is also desirably included in the adhesive for ease in applying the adhesive, particularly in application to the smooth surface of gypsum wallboard. The preferred wetting agents are those which also act as a dispersing agent for the components of the adhesive. Suitable wetting agents for these purposes include the nonionic type. Specific examples of such wetting agents include 150 octylphenoxypoly(ethyleneoxyl)ethanol and nonyl phenyl polyethylene glycol ether. A small amount of wetting agent is satisfactory, usually between about 0.2 to 0.6 percent by weight of the total composition, preferably between about 0.3 to 0.4 percent.

The adhesive of the invention may be prepared by simple mixing and bodying of the ingredients to a paste of desired consistency. However, it has been found that the time during which the adhesive remains tacky, i.e. "open time," may be greatly enhanced when the adhesive is prepared by a preferred method in which the modified starch is first thoroughly dissolved in water before addition of any substantial portion of the filler components. In preparing the adhesive by this preferred method the modified starch is added to water and completely dissolved by mixing. The amount of water employed is desirably sufficient to a starch solution of relatively high concentration between about 20 to 35% by weight, preferably between about 25 to 30% by weight. Original dissolution of the starch to form solutions of such concentrations is preferably carried out in a high speed, high shear mixer such as Cowles Dissolver. Mixer operating speeds are preferably of the order of about 1500 to 1850 r.p.m. The time of addition of the preservative for the starch is not critical. Preferably, the preservative is next added to the starch solution and admixed therewith in the high speed mixer. The concentrated starch solution is then transferred to a heavy duty mixer and diluted with a moderate amount of water preparatory to addition of the filler components. The water for dilution is preferably added in an amount between 30–80% based on the weight of the original starch solution. A suitable heavy duty mixer is a dough mixer equipped with a Sigma type blade. The time of addition of the wetting agent is also not critical and preferably accomplished after the starch solution is transferred to the heavy duty mixer and after addition of the water but prior to addition of the filler materials. Addition of the wetting agent is preferably followed by mixing for only a short time, usually ½ to 3 minutes. The reinforcing fibrous filler is preferably first added followed by mixing for a short time between about 1–10 minutes at about 25–50 r.p.m. The particulate filler material is then added and admixed with the solution at about 25–50 r.p.m. while adding the major portion of the water to be contained in the adhesive. Preferably, the last portions of water are added slowly with the mixing continued until the solution is smooth and free of lumps. Finally, there is added a pregelled solution to complete preparation of the adhesive by bodying of the composition to the desired consistency. The pregelled or bodying solution desirably contains a bodying agent and wetting agent. The bodying agent preferably has particle size less than about 1.0 micron and desirably in the range of about 0.10 to 0.20 micron. The preferred bodying agent is colloidal bentonite and attapulgus clay having particle size predominantly within the range of about 0.10 to 0.20 micron. Other suitable bodying agents which may be used include methyl cellulose, algin derivatives and hydroxyethyl cellulose. The wetting agents which may be used with the colloidal clay include the alkali metal salts of the carboxylated polyelectrolytes, preferably the sodium salt. The bodying agent is desirably added to the adhesive mixture as an aqueous solution containing between about 5–40%, preferably 10–30%, of the bodying agent and between about .1 to .3%, usually .2 to .25%, by weight of the wetting agent. The pregelled solution may be suitably prepared by admixing the bodying agent and wetting agent with water in an amount to form a solution having a density between about 9.0–9.2 lbs./gal. Mixing is desirably carried out in a high speed high shear mixer similar to the type employed with the original dissolution of the starch. After addition of the pregelled solution, the density of the adhesive composition is adjusted to between about 12.0–12.8 lbs./gal. by addition of either water or filler, as required. It is recommended that the composition prepared by such preferred method be allowed to stand for at least about 1–5 hours before use to develop optimum adhesive properties. Viscosity of the adhesive should be within the range of about 100 to 300 cm.g. (centimeter grams), preferably 160 to 180, as determined by the Brabender "Visco-Corder" Model VC-3, at 50 r.p.m. after 5 minutes in 1 pint container using 2,000 cm.g. cartridge and standard flag paddle. The adhesives so prepared will have extended "open times" up to 15 to 30 minutes or even more, in addition to other desired properties making it especially suitable for efficient, high strength bonding of gypsum wallboard and assembly of partition systems constructed therefrom.

The following example demonstrates the practice and advantages of the present invention.

*Example 1*

Into a 55 gallon mixing drum containing 30 gallons of water there was slowly added about 87.5 lbs. of an ethylene oxide modified potato starch obtained under the trademark "Starfilm" 34DD from Morningstar-Paisley, Inc. The potato starch had been modified by addition of about 3% ethylene oxide based on the weight of the starch with the product rapidly dried to a fine granular material fully soluble in water at room temperature. The modified starch had a viscosity of about 5,400 cps. at 25° C. as determined by a Brookfield viscometer from a 20% solution prepared by fully dissolving the starch in water with moderate mixing for about 1 minute and after the solution was allowed to stand at room temperature for about 5 hours. The mixing drum was equipped with a 10 inch high shear Cowles type mixing blade which was operated at about 1,800 r.p.m. for about 17 minutes until all starch particles were dissolved in the water. There was then added to the solution as a starch preservative about 1.75 lbs. of a mixture of chlorinated phenols obtained from Dow Chemical Company under the trademark "Dowicide A." The resulting solution was charged to a 150 gallon capacity heavy dough mixture equipped with a Sigma type blade. About 167 lbs. of water was added to the modified starch solution followed by the addition of 2,000 cc. of a nonionic polyethyleneoxy derivative wetting agent obtained under the trademark "Igepal" CA630 from the Antara Chemicals Division of General Aniline & Film Corporation. The mixer was operated at about 45 r.p.m. for about 1 minute to mix the wetting agent and additional water into solution. There was then added to the solution about 87.5 lbs. of short asbestos fibers designated 7RF1 by the Johns-Manville Corporation. The asbestos fibers were mixed into the solution over the course of about 2 minutes at 45 r.p.m. There was then added 200 lbs. of a finely divided limestone having particle size predominantly between about 1 to 25 microns and obtained from the Thompson Weinman & Company under the trademark "Duramite." The mixer was then operated at about 45 r.p.m. and 500 lbs. of limestone admixed in the course of about 10 minutes. This was followed by the addition of about 83 lbs. of water which was carried out slowly over the course of about 10 minutes after which mixing was continued at about 45 r.p.m. for an additional 5 minutes until smooth and free of lumps. There was then added about 5 gallons of a 20% solids solution prepared by adding 9.12 lbs. of colloidal clay and 1.5 ounces of a wetting agent to 36.4 lbs. of water in a vessel equipped with a 6" Cowles type mixing blade. The colloidal clay was obtained under the trademark "Attagel" 30 from the Minerals & Chemical Phillip Corporation. The wetting agent was a sodium salt of a carboxylated polyelectrolyte obtained under the trademark "Daxad" 30 from the Dewey & Almy Chemical Division of W. R. Grace Company. The solution was prepared by mixing for about 15 minutes at 1,800 r.p.m. until the solution had a density of about 9.1 lbs./gal. Addition of the clay gel to the paste compound was accomplished by mixing in the dough mixer for about 5 minutes at 45 r.p.m. Density of the solution as measured with a Mudwate hydrometer was about 12.4 lbs./gal. The resulting adhesive composition after standing for about 24 hours had a viscosity as measured by Brabender Visco Corder of 160–180 cm.g. at 50 r.p.m.

The adhesive composition prepared as outlined in Example 1 was employed in the assembly of gypsum wallboard test panels which consisted of two 4 x 6 inch pieces of ½ inch gypsum wallboard separated by a W-shaped stud prepared by scoring and breaking an 8 inch wide piece of gypsum wallboard. The W-shaped stud had a length of 4 inches and was adapted to separate the two wallboard pieces by a distance of 2 inches. The stud was placed in an inverted "W" position with the single contact edges about 5 inches apart. The adhesive was then applied as an approximately ½ inch diameter bead to the two double contact edges of the stud and the first of the side pieces pressed onto the edges. The assembly was inverted and adhesive applied to the two single contact edges and the remaining double contact edge of the stud. The second wall side piece was then pressed in position and the prepared panel clamped in place and allowed to dry for 7 days. A number of test panels prepared by the same procedure were tested to determine shear strength. The shear tests were made by securing a 4 x 6 inch piece of ½" plywood to each of the wallboard pieces in such a manner that the plywood pieces were offset by ¾ inch from opposite ends of the panel so that when placed in the strength test machine the panel was stressed in shear. Shear strengths on testing of 6 specimens averaged 252 load pounds. The shear strength values represented between about 150–200% increase in strength over several commercially available gypsum wallboard joint cements and adhesives.

In addition to gypsum wallboard the superior strength and adhesive properties of the composition of the invention may be realized in the bonding of outer materials, especially of the structural type including board and coarse surfaced materials and particularly those composed of or containing cellulosic material of which insulation type mats and boards such as fiberboard are specific examples.

Although certain preferred embodiments of the invention have been disclosed for purpose of illustration, it will be evident that various changes and modifications may be made therein without departing from the scope and spirit of the invention.

I claim:

1. An adhesive composition especially adapted for bonding of gypsum and cellulosic materials comprising an aqueous paste containing (a) about 3 to 15% by weight of a modified starch obtained by reacting and combining root starch selected from the group consisting of tapioca starch and potato starch with a lower alkylene oxide selected from the group consisting of ethylene oxide and propylene oxide in an amount between about 1–10% based on the weight of the starch at a temperature between about 100–180° F., said modified starch being soluble in water at room temperature and having a viscosity between about 3,000–7,000 cps. as measured in a 20% aqueous solution at 25° C.; (b) about 2 to 20% by weight of an asbestos fibrous filler; (c) about 30 to 65% by weight of a particulate inert filler material; and (d) water in an amount sufficient to give a solids content between about 45–75% by weight; said adhesive composition having a viscosity between 100 to 300 centimeter grams.

2. The adhesive composition of claim 1 in which the modified starch is obtained by reacting potato starch with between 1–7% ethylene oxide based on the weight of the starch and in which the modified starch has a viscosity between about 4,000–6,500 cps. in a 20% aqueous solution at 25° C.

3. An adhesive composition especially adapted for bonding of gypsum and cellulosic materials comprising an aqueous paste containing (a) about 5 to 10% by weight of a modified starch obtained by reacting and combining potato starch with between about 1–7% ethylene oxide based on the weight of the starch at a temperature between about 100–180° F., said modified starch being soluble in water at room temperature and having a viscosity between about 4,000–6,500 cps. in a 20% aqueous solution at 25° C.; (b) about 4–10% by weight of an asbestos fibrous filler; (c) about 45 to 55% by weight of finely divided limestone; (d) about 0.1 to 1.0% of a preservative for said starch; (e) about 0.5 to 3% of a wetting agent; and (f) water in an amount sufficient to give a solids content between about 55–70% by weight; said adhesive composition having a viscosity between 100 to 300 centimeter grams.

4. The adhesive composition of claim 3 in which the limestone has a particle size predominantly within the range of about 1 to 25 microns.

5. The method of preparing an adhesive composition especially adapted for high strength bonding of gypsum and cellulosic materials comprising (a) fully dissolving in water a modified starch obtained by reacting and combining root starch selected from the group consisting of tapioca starch and potato starch at a temperature between about 100–180° F. with between about 1–10% based on the weight of the starch of a lower akylene oxide selected from the group consisting of ethylene oxide and propylene oxide, said modified starch having a viscosity between 3,000–7,000 cps. as measured in a 20% aqueous solution at 25° C., the amount of starch so dissolved representing essentially the entire requirement to form said adhesive; (b) thereafter mixing asbestos fibrous and particulate inert filler material into said starch solution; and (c) then bodying said mixture to a paste composition containing between about 3 to 15% by weight of the modified starch, 2 to 20% by weight of fibrous filler and 30 to 65% by weight of particulate inert filler and having a total solids content between about 45–75% by weight and a viscosity between 100 to 300 centimeter grams.

6. The method for preparing an adhesive composition especially adapted for high strength bonding of gypsum and cellulosic materials comprising (a) fully dissolving a modified starch in sufficient water to form a 20 to 30% by weight solution, said modified starch obtained by reacting and combining potato starch with 1–7% ethylene oxide based on the weight of the starch at a temperature between about 100–180° F. and having a viscosity between about 4,000–6,500 cps. in a 20% aqueous solution at 25° C., the amount of dissolved starch representing essentially the entire requirement to form said adhesive; (b)

thereafter admixing asbestos fibrous reinforcing and finely divided limestone into said solution and adding additional water to adjust the solids content to between about 55–70% by weight and form a mixture containing between about 5 to 10% of said modified starch, 2 to 20% by weight of fibrous filler and 30 to 65% by weight of limestone; and (c) then bodying said mixture to a paste composition having a viscosity between 100 to 300 centimeter grams and a density between about 12.0–12.8 lbs./gal.

7. The method of claim 6 in which the mixture is bodied by the addition of clay selected from the group consisting of bentonite and attapulgus clays and having particle size predominantly within the range of about 0.10 to 0.20 microns.

8. Gypsum wallboard partitions bonded with the adhesive composition of claim 1.

References Cited

UNITED STATES PATENTS

| | | | |
|---|---|---|---|
| 1,804,245 | 5/1931 | Bruce | 106—214 |
| 1,863,731 | 6/1932 | Schorger | 106—214 |
| 2,351,683 | 6/1944 | Hughes et al. | 106—214 |
| 2,534,008 | 12/1950 | Fiero et al. | 106—214 |
| 2,662,024 | 12/1953 | Riddell et al. | 106—114 |
| 2,853,484 | 9/1958 | Lalkema et al. | 260—233.3 |
| 2,885,374 | 5/1959 | Sweeney | 106—210 |

ALEXANDER H. BRODMERKEL, *Primary Examiner.*

L. B. HAYES, *Assistant Examiner.*